Patented June 4, 1935

2,003,613

UNITED STATES PATENT OFFICE 2,003,613

WATERPROOFING CONCRETE

Edward W. Scripture, Jr., Cleveland Heights, Ohio, assignor to The Master Builders Company, Cleveland, Ohio, a corporation of Ohio No Drawing. Application May 9, 1932, Serial No. 610,309

14 Claims. (Cl. 106—27)

This invention relates to the waterproofing of concrete and mortar, and structures or articles made therefrom, the essential material of such concrete or mortar being a hydraulic cement of the Portland type. All such cements consist of fine-textured, dry-powders which are mixed with water and aggregate after which chemical changes occur leading to crystallization and hardening, this also being often accompanied by gradual internal chemical reactions. It is not necessary for present purposes to examine the question as to the particular nature of these reactions further than to observe that the water combines in some way with the ingredients of the cement, that crystallization of some kind occurs with a certain local shrinkage causing pores in the final structure, and that a certain amount of lime is gradually set free during the setting action which may last several weeks.

It is characteristic, also, of all such materials that the porous solid structure produced by such setting is more or less permeable by water, which causes concrete floors and walls to absorb and hold water, at least in damp places; also whenever such water works to the surface and evaporates the solutes therein are left behind in the form of an unsightly coating known as "efflorescence". Many expedients have been attempted for waterproofing these concrete and mortar structures. One of the most successful procedures heretofore employed for waterproofing purposes is that set forth in Letters Patent No. 851,247 to Newberry, which procedure is based upon the effect of a water-repellent insoluble metallic soap in coating the surfaces of the pores so as to render them negatively absorptive as regards water; that is to say that water instead of being drawn into such soap-walled capillaries is expelled therefrom. However, the procedure of introducing such metallic soap into the concrete mixture is attended with some difficulty. For example it has been proposed to mix a soluble soap of some kind with the tempering water which is employed in wetting the mixture of cement and aggregate. The material sometimes used for this purpose is ammonium stearate. Sodium stearate (common soap) is also sometimes used although less soluble than the ammonia compound. The effect of these substances is, upon contact with such lime salts as those present in cement, to produce a double decomposition yielding an insoluble calcium soap (ordinarily calcium stearate) and a soluble salt of sodium or ammonium, which latter obviously increases the amount of soluble material in the structure capable in the long run of producing efflorescence. A second drawback of this procedure is that the reaction between the soluble soap and the cement occurs immediately wherever the liquid comes in contact therewith, thereby seriously impeding the access of the water to the cement which is essential to its setting. Theoretically, indeed, it is impossible to produce concrete at all in this way, the soap reaction serving at every point to preclude such access of water to the calcium aluminate as to enable hydration; practically it is possible with difficulty to effect a mixture, and to obtain a set cement although this is almost always of deficient strength. Another procedure has been to form calcium stearate in advance and independently of the cement and to grind the same into the cement. This procedure affords a stronger concrete but a less effective waterproofing, since the calcium stearate is chemically unreactive; although here again the waterproofing is substantially as effective in impeding the original mixing of the cement, at which time it is a detriment, as it is after the cement has become set, when for the first time the waterproofing becomes desirable.

The objects of my invention are, accordingly, the improvement in the integral waterproofing of concrete by the employment of water-repellent substances by providing a new and improved mode of mixing whereby the weakening of the ultimate concrete is avoided or at least diminished, whereby the mixing of the ingredients is facilitated as compared with other waterproof mixtures, and whereby the waterproofing effect shall be little if any exhibited at the outset, but shall increase with lapse of time. Another object of my invention is the provision of a composition of matter for the use in question which is more concentrated than any composition heretofore employed for the purpose, thereby reducing the cost of packages and the expense of freight and cartage. Another object of my invention is the improvement of a composition and process for waterproofing cement which shall employ less expensive materials than heretofore, and at the same time shall obtain a better and stronger product; the provision of a process and composition of matter for waterproofing cement which shall obviate the introduction in the concrete of accessory solutes; while further objects and advantages of the invention will become apparent as the description proceeds.

According to my invention I effect the waterproofing desired by the use of a water emulsion of a fatty acid, such as stearic acid, capable of reacting with calcium salts to produce a water-repellent insoluble soap. The preparation of such an emulsion can be very simply performed. The desired amount of water and of fatty acid are heated independently, both to a temperature above the melting point of the fatty acid; an emulsifying agent is added to the water (for example, ammonium linoleate, potassium abietate, etc.), after which the molten fatty acid is added slowly to the water with vigorous agitation, such agitation being continued until the mixture has been cooled below the solidifying point of the acid. A successful formula is:

| | |
|---|---|
| Water | 70% more or less |
| Stearic acid | 30% more or less |
| Emulsifying agent | 1% more or less |
| Total | 100% |

The result of emulsifying this mixture as described is the production of a mass which, unless colored, has about the appearance and consistency of soft lard, and is permanent in all weathers so that it can be shipped and stored safely. To use, a measured or weighed portion is introduced into the mixer in proportion to the cement content of the mix, along with the usual cement, aggregate, and tempering water. Under the influence of the agitation and grinding this emulsion, although water-repellent and lighter than water, becomes thoroughly mixed and disseminated throughout the entire grout, and without substantially impeding the wetting of the grout. The concrete is then poured into forms or the mortar laid and worked in any manner desired, and cured like any other concrete. The result of some comparative trials are indicated below:

*Compressive strength*

| | Lbs. per square inch | | | |
|---|---|---|---|---|
| | 1 | 2 | 3 | 4 |
| | Plain | Ammonia soap in tempering water | Calcium stearate in cement | Stearic acid emulsion in tempering water |
| 3 day | 1433 | 1210 | 1242 | 1337 |
| 7 day | 2101 | 1656 | 2037 | 2260 |
| 28 day | 2418 | 1973 | 2291 | 2355 |

These trials included (1) plain concrete without any waterproofing; (2) concrete water-proofed by the use of ammonia soap in the tempering water; (3) concrete containing calcium stearate initially mixed with cement; (4) and concrete made as above described employing stearic acid in the form of a water emulsion.

In all the above cases the same proportion of stearic acid was employed, namely: ⅓ lb. of stearic acid per 100 lb. sack of cement. Each figure given is the average of three tests. All the test specimens represented in the foregoing table, 36 in all, were made from a single bag of cement and a single bag of standard Ottawa silica sand in the proportions of 1 to 3 by weight; these specimens were made in four batches, each employing the same measured amount of water, the materials, procedures, manipulation and curing being conducted in strict accordance with the standard practice recommended by the American Society for Testing Materials. The results exhibited in the foregoing table are representative of many other tests I have performed.

It will be observed that the amount of weakening is less by my process than by any other. There seems to be some reason to believe that the reaction producing the waterproofing effect occurs more slowly when the unreacted fatty acid is employed than is the case when the same is introduced in previously effected combination. At least due to the fact that the tempering liquid is mixed with the cement and aggregate at the same time as this emulsion, the liquid has an opportunity to wet the cement particles thoroughly before such wetting is inhibited by soap formation, while the formation of soap follows and produces such a coating of the pores of the resulting concrete as to prevent the absorption or penetration of water. Just when this formation of soap occurs it is apparently impossible and certainly unimportant to establish. It is my belief that it occurs only slowly, due to the low temperatures existing and to the dilutions employed, since saponification occurs only slowly even with concentrated lye at a boiling temperature, and there is some reason to postulate that the combination takes place between the fatty acid and the lime which is gradually evolved during the setting action. It is also immaterial from the practical standpoint whether all the fatty acid ever combines with bases, but it is important that any bases with which it does combine are those already present in the structure, by reason of which fact the effect of this material is not only to waterproof, but also to fix against solution or translocation such bases as are already present as against introducing new and mobile bases which has been the result of certain prior waterproofing procedures.

Any of the higher water-soluble fatty acids can be employed within my invention, preferably those represented by the type formula $C_nH_{2n}O_2$ wherein $n$ is at least 10, of which stearic acid is a common example; although the less saturated acids represented by the type formula $C_nH_{2n-1}O_2$ (of which oleic acid is a common example) are usable in some cases, especially such as do not readily absorb oxygen, but those acids of still less degree of saturation (such as linoleic acid) are much less desirable due to an excessive weakening effect on the concrete. For these reasons I prefer stearic acid to any other, but do not limit myself thereto, since some of the other higher fatty acids such as palmitic, margaric, etc. can be used with scarcely abated success, and even the less saturated acids when used as I have set forth are less objectionable than when used in other modes.

The advantage of adding the fatty acid in the form of an emulsion in water is that due to the finely dispersed condition of the fatty acid and the envelopment of its particles in an aqueous phase it is rather readily broken up and dispersed throughout the mixture of cement, aggregate and water when agitated therewith after the manner customarily employed in mixing concrete; whereas ordinary stearic acid or even stearic acid (or other fatty acid) having water emulsified in it the fatty acid constituting the continuous phase is not subject to such disintegration and dissemination. This mixing is, of course, best done by machine since thoroughness is more likely to be achieved in this way, but it is perfectly feasible to mix the ingredients by hand provided that it be thoroughly done. The fatty acid also increases the plasticity of the mix.

This material also offers a solution of the long vexed problem of how to pack, store, and transport coloring materials and incorporate the same in the cement. Such coloring materials are usually finely-powdered minerals. Attempts to use them dry are almost always unsuccessful since it is difficult to wet them properly with the liquid and difficult to mix them uniformly with the cement, thus producing streaks of color and also weakening the cement since such "fines" are injurious unless uniformly scattered and in proper ratio to other aggregates. Attempts to package and use them wet have entailed difficulty because of their propensity to settle and cake in the package, sometimes before opening and always upon exposure to air. All these difficulties are avoided by mixing the pigment with this emulsion since the stiffness of the mass is sufficient to prevent segregation or settling and its greasy character shields it from evaporation. The emulsion is made up to such a stiffness as to produce a reliable waterproofing effect with a given amount (by weight or volume) to each sack of cement; by incorporating a given amount of coloring material in this emulsion the user can be assured of a predetermined color in the resulting concrete in accordance with a definite color scale.

It is not, of course, imperative that the emulsion be carried to the stiffness of butter but any less concentration can be employed, also other chemicals can be used in conjunction therewith such as pozzuolanic material, mineral gels, metallic hardeners, etc., and I do not limit myself in any way except as specifically set forth in my several claims which I desire may be construed each according to its own limitations and independently of limitations contained in other claims.

Having thus described my invention what I claim is:

1. The process of producing waterproof concretes and mortars which comprises the steps of first producing a water-emulsion of a soap forming fatty acid, and then mixing and agitating said emulsion with hydraulic cement, aggregate and tempering water until thoroughly disseminated throughout the mixture.

2. The process of producing waterproof concretes and mortars which comprises the steps of first producing a water-emulsion of stearic acid, and then mixing and agitating such emulsion with hydraulic cement, aggregate and tempering water until the cement and aggregate have become thoroughly wetted by the water and the emulsion has become disseminated throughout the mixture.

3. The method of retaining mineral pigments in suspension in a water-containing vehicle so as to prevent settling, segregation, caking, or drying of the same, and of incorporating said pigments with the constituents of concretes and mortars, which includes the steps of producing an emulsion of free soap forming fatty acid and water and incorporating said pigment therewith until it comes time to mix the concrete, and then mixing and agitating said emulsion with the cement, aggregate and tempering water until the coloring material is uniformly disseminated.

4. A mix for forming a waterproof cement article comprising a body of hydraulic cement, aggregate and tempering water having mixed therewith an emulsion of stearic acid in water.

5. A mix for forming a waterproof cement article comprising a body of hydraulic cement, aggregate and tempering water having mixed therewith an emulsion of soap forming fatty acid in water.

6. A mix for forming a colored cement article comprising a body of hydraulic cement, aggregate and tempering water having mixed therewith a water emulsion of a soap forming fatty acid having a mineral pigment disseminated and suspended therein.

7. A mix for forming a colored cement article comprising a body of hydraulic cement, aggregate and tempering water having mixed therewith a water emulsion of stearic acid having a coloring material mixed therewith.

8. The process of producing waterproof concretes and mortars which comprises the steps of first producing a water-proofing material comprising essentially a water-emulsion of a soap forming fatty acid, and then mixing and agitating said emulsion with hydraulic cement, aggregate and tempering water until thoroughly disseminated throughout the mixture.

9. The process of producing waterproof concretes and mortars which comprises the steps of first producing a water-emulsion of a soap forming fatty acid in which the emulsifying agent forms but a relatively small percentage of the mixture, and then mixing and agitating said emulsion with hydraulic cement, aggregate and tempering water until thoroughly disseminated throughout the mixture.

10. A mix for forming a waterproof cement article comprising a body of hydraulic cement, aggregate and tempering water having mixed therewith a waterproofing material comprising essentially an emulsion of a soap forming fatty acid in water.

11. The process of producing waterproof concrete and mortars which comprises the steps of first producing a waterproofing compound of a water-extensible nature in which a soap forming fatty acid constitutes 20% or more of the weight of the compound, and then mixing and agitating said emulsion with hydraulic cement, aggregate and tempering water until thoroughly disseminated throughout the mixture.

12. A mix for forming a waterproof cement article comprising a body of hydraulic cement, aggregate and tempering water having mixed therewith a waterproofing compound of a water-extensible nature having a soap forming fatty acid content in excess of 20% of the weight of the compound.

13. The process of producing waterproof concretes and mortars which comprises the steps of first producing a waterproofing compound consisting substantially entirely of a water-extensible paste of a soap forming fatty acid, then mixing and agitating said paste with hydraulic cement, aggregate and tempering water until thoroughly disseminated throughout the mixture.

14. A mix for forming a cement article comprising a body of hydraulic cement, aggregate and tempering water having mixed therewith a waterproofing compound consisting substantially entirely of a water-extensible paste of a soap forming fatty acid.

EDWARD W. SCRIPTURE, Jr.